United States Patent Office 3,532,871
Patented Oct. 6, 1970

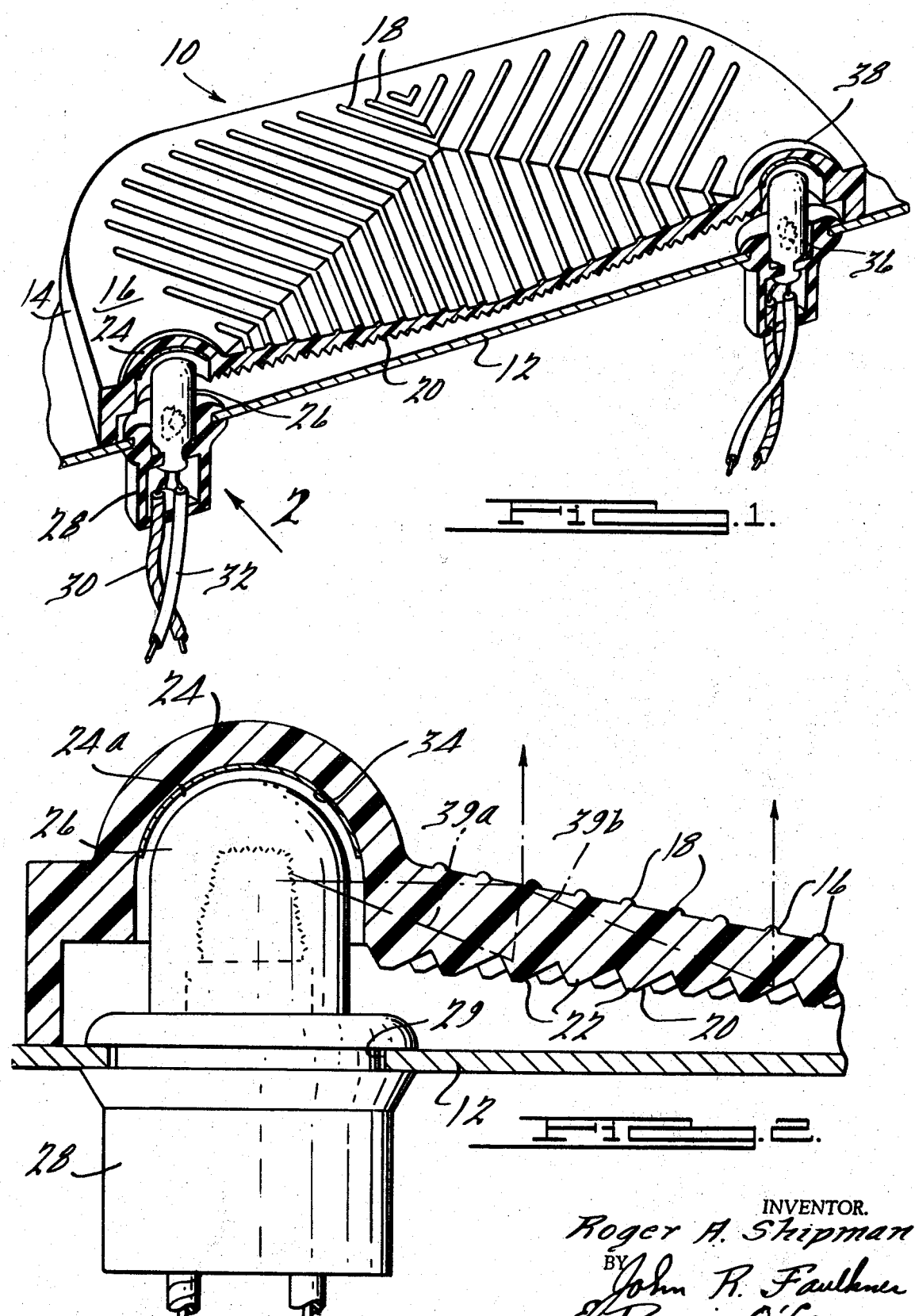

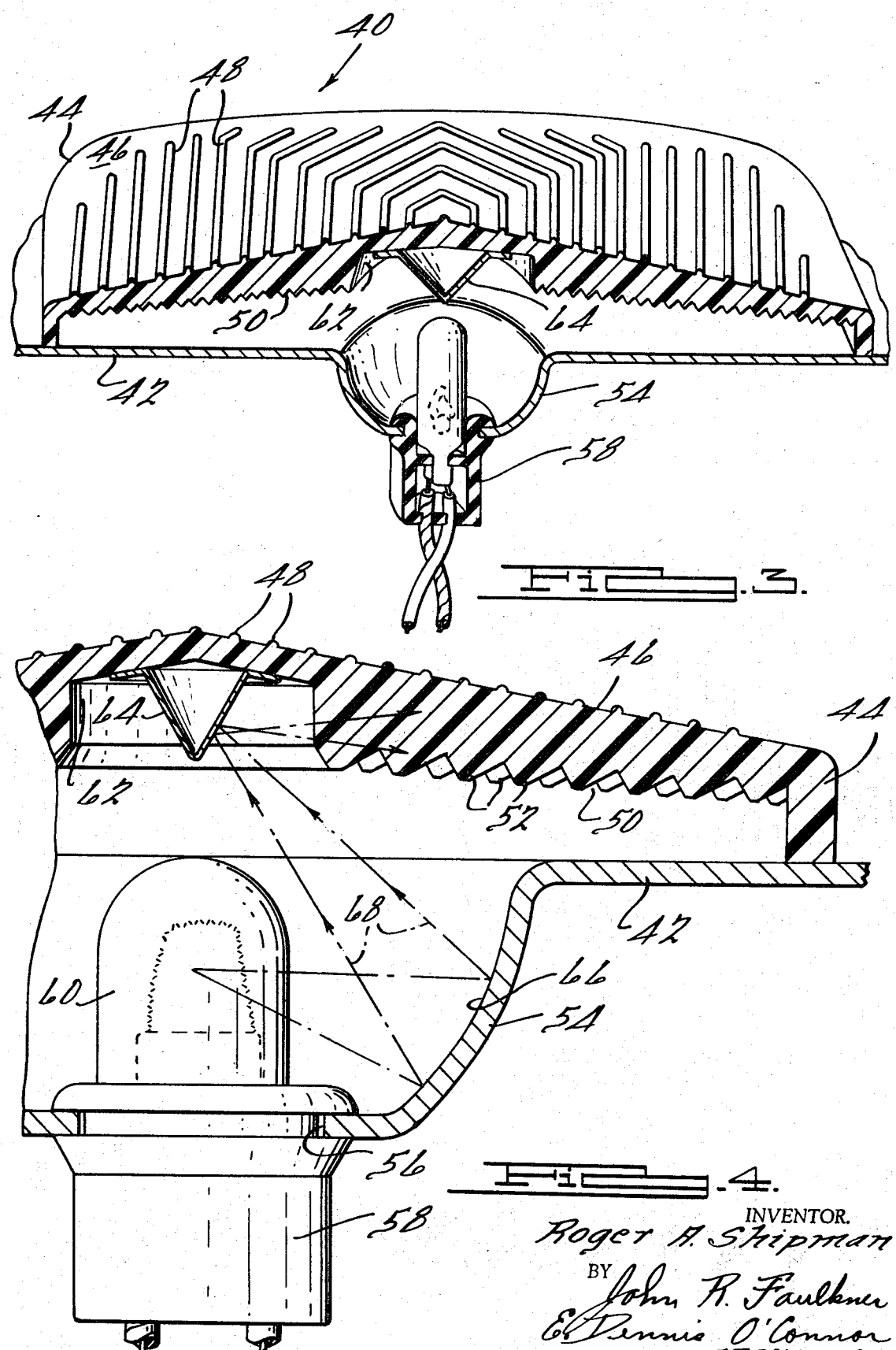
Oct. 6, 1970     R. A. SHIPMAN     3,532,871
COMBINATION RUNNING LIGHT-REFLECTOR
Filed May 20, 1968     2 Sheets-Sheet 2
INVENTOR.
Roger A. Shipman
BY John R. Faulkner
E. Dennis O'Connor
ATTORNEYS.

3,532,871
COMBINATION RUNNING LIGHT-REFLECTOR
Roger A. Shipman, Livonia, Mich., assignor to Ford Motor Company, Dearborn, Mich., a corporation of Delaware
Filed May 20, 1968, Ser. No. 730,468
Int. Cl. B60g 1/00; F21v 7/04
U.S. Cl. 240—7.1                    1 Claim

ABSTRACT OF THE DISCLOSURE

A combination running light-reflector for a motor vehicle body. A light source is secured to body structure interior of a light permeable member. An opaque member prevents light emitted by the light source from passing directly through the light permeable member without first impinging on reflective prism segments formed on the interior surface of this member. The light then is reflected through the member to exterior of the vehicle without passing through the reflective prism segment.

BACKGROUND OF THE INVENTION

In the past, various designs of combination or quasi-combination running light-reflectors have been utilized in motor vehicle bodies. Certain of these designs include a translucent member divided into two parts. One of these parts functions as the lens of the running light bulb while the other parts has light reflective means formed thereon so that this other part functions separately as a reflector. Such a design necessitates that the exterior surface area of the translucent member be of sufficient area so that both lens and reflector thereof meet minimum size design parameters.

Other prior art combination running light-reflectors include a translucent member having a one-way reflective surface facing the exterior of the vehicle to reflect ambient light impinging thereon. A light bulb has been positioned interiorly of the translucent member and emits light that impinges directly on reflective surface before passing through and translucent member to exterior of the vehicle. A problem attendant the use of these running light-reflectors is that the intensity of the light emitted by the bulb is diminished quite significantly as this light is diffused by the reflective surface before passing through the translucent member. Also, the depth to which such a device protrudes into the vehicle body structure precludes mounting the device at certain positions, such as wheel wells, on the vehicle body.

An object of this invention is to provide a combination vehicle running light-reflector including a translucent member having a single surface area through which both reflective ambient light and light emitted from a bulb are projected. This invention also provides that light emitted from a bulb does not impinge on a reflective surface formed on the translucent member from without said member, but rather is reflected by the reflective surface from within said member. Also, in one embodiment of this invention, the depth of the running light-reflector substantially is reduced relative to conventional designs.

SUMMARY OF THE INVENTION

A combination running light-reflector assembly constructed in accordance with this invention is adapted to be utilized in conjunction with a motor vehicle body. This assembly includes a light permeable member secured to the exterior of the body and having a pair of spaced apart, opposed sides. One of the sides comprises a portion of the exterior surface of the body. Light reflector means are formed on the other of these sides and reflects light impinging thereon through the member to exterior of the vehicle. Illuminating means are operatively secured to the body and emit and direct light between the sides of the light permeable member such that the light impinges on the reflector means from within the light permeable member. The reflector means comprise a plurality of integral prism segments formed on the interior surface of the light permeable member.

DESCRIPTION OF THE DRAWINGS

FIG. 1 is an isometric view, having parts cut away, of a first embodiment of running light-reflector constructed in accordance with this invention;

FIG. 2 is an enlarged view taken along the arrow 2 of FIG. 1;

FIG. 3 is an isometric view, having parts cut away, of a second embodiment of running light-reflector constructed in accordance with this invention; and FIG. 4 is an enlarged elevation view of a portion of the device of FIG. 3.

DETAILED DESCRIPTION OF THE INVENTION

Referring now in detail to the drawings and in particular to FIGS. 1 and 2 thereof, the numeral 10 denotes generally a first embodiment of a combination running light-reflector constructed in accordance with this invention and adapted to be mounted on a sheet metal panel 12, such as a fender, of a motor vehicle body. A lens-reflector member 14, constructed of translucent material so as to be light permeable, is secured to the exterior surface of sheet metal 12. Member 14 has an exterior surface 16 that may have a plurality of raised ribs 18 formed thereon. The purpose of these ribs will be explained below. The interior surface 20 of member 14 has formed on a portion thereof, a plurality of prism segments 22. As is well known in the art, these prism segments form a reflective surface that reflects light impinging thereon.

Member 14 has a raised portion 24 partially defining a cavity 24a that receives a portion of a light bulb 26. Bulb 26 is secured in a socket 28 that extends through a hole 29 in sheet metal 12 and is secured to the sheet metal in this position.

Electrically conductive leads 30 and 32 connect bulb 26 to a source of electrical current. An opaque shield 34 is secured to the interior surface of member 14 proximate the bulb 26 so that light emitted from the bulb will not pass directly through member 14 to exterior of the vehicle.

A second bulb 36 is received in a cavity defined by second raised portion 38 of member 14. Bulb 36 is mounted and functions in a manner identical to bulb 26.

The device illustrated in FIGS. 1 and 2 acts as a reflector when ambient light is directed from exterior of the vehicle through member 14. This ambient light will strike prisms 22 formed on the interior surface 20 of member 14 and will be reflected by these prisms back through member 14 to exterior of the vehicle.

When the motor vehicle is operated during periods of darkness, the apparatus described above functions as a running light when bulb 26 is operative due to current being directed thereto through leads 30 and 32. Light emitted from bulb 26 passes transversely of sides 16 and 20 of member 14 and enters member 14 between these sides. A portion of this light identified by the line 39a directly strikes prisms 22 and is reflected through the body of member 14 to exterior of the vehicle. Other light emitted by bulb 26 and represented by the line 39b strikes exterior surface 16 of member 14 and is reflected thereby such that it impinges on prisms 22 for reflection to exterior of the vehicle.

The ribs 18 formed on the exterior surface 16 of member 14 serve to diffuse light exiting from member 14 so that it may be visible to observer located in a wide field about combination running light-reflector 10.

Referring now to FIGS. 3 and 4 of the drawings, the numeral 40 denotes a second embodiment of a combination running light-reflector assembly constructed in accordance with this invention and adapted to be mounted on the exterior surface of a body sheet metal panel 42. Assembly 40 includes a translucent, light permeable member 44 having an exterior surface 46 on which are formed a plurality of ribs 48 serving the same function as ribs 18 in the embodiment of the invention illustrated in FIGS. 1 and 2. A plurality of prism segments 52 are integrally formed on the interior surface 50 of member 44 and constitute a reflective surface.

The portion of sheet metal panel 42 opposite the central portion of member 44 is formed into a dish shaped projection 54 having a hole 56 extending therethrough. A bulb socket 58 is mounted in hole 56 and mounts a bulb 60 therein. The portion of member 44 most proximate to bulb 60 has a portion 62 thereof cut away to form a recess. A cone shaped reflector 64 is mounted to the interior surface 50 of member 44 within cut away portion 62. Reflector 64 is oriented such that the apex of the cone is proximate bulb 60. The interior portion 66 of disc shaped projection 64 is polished so as to form a reflector partially surrounding bulb 60.

When functioning as a reflector, the embodiment of the invention illustrated in FIGS. 2 and 3 reflects ambient light passing through member 44 from the exterior thereof by means of prism segments 52. This ambient light is reflected by the prism segments through member 44 to exterior of the vehicle. Upon bulb 60 being illuminated, light emitted by this bulb and represented by the arrows 68, is reflected by polished surface 66 of projection 54 such that it impinges upon cone-shaped reflector 64. From reflector 64, this light is reflected transversely of the sides of member 44 into the main body of member 44. This light then impinges upon prisms 52 by which it is reflected through member 44 to exterior of the vehicle. Other light emitted by bulb 60 impinges directly upon cone-shaped reflector 64 and is reflected into the body of member 44 between member sides 46 and 50. Reflector 64 also serves as a shield to prevent light from bulb 60 passing directly through member 44 to exterior of the vehicle.

It thus may be seen that this invention provides a combination running light-reflector for use on a motor vehicle body wherein the surface of a translucent, light permeable member included in the device functions as both a reflector and the lens for a vehicle running light bulb. This invention further provides the light from the bulb that is passed through the translucent member to exterior of the vehicle does not pass through the reflective interior surface of the member. The light observed from exterior of the vehicle thus is not diminished in intensity due to its passing through a reflective surface. The translucent, light permeable member thus may function as both a running light and a reflector without having an unduly large surface area that would detrimentally affect the pleasing features of the motor vehicle styling.

One embodiment of this invention provides a combination running light-reflector that easily may be packaged in a motor vehicle body since the depth to which it extends into the body structure greatly is decreased relative to previous designs.

It is to be understood that this invention is not limited to the exact construction illustrated and described above, but that various changes and modifications may be made without departing from the spirit and scope of the invention as defined by the appended claim.

I claim:

1. A combination running light-reflector assembly for a motor vehicle body, said assembly including a light permeable member secured to the exterior of said body and having a pair of spaced opposed sides, one of said sides comprising a portion of the exterior surface of said vehicle, light reflector means formed on the interior of said sides and reflecting light impinging thereon through said member to exterior of said vehicle, and illuminating means operatively secured to said body and emitting and directing light between said sides such that said light impinges on said reflector means from within said member said second light reflector including a first reflector secured to said member exterior of said light source and a second reflector partially surrounding said light source.

References Cited

UNITED STATES PATENTS

| | | | |
|---|---|---|---|
| 1,750,994 | 3/1930 | Dorman | 240—8.3 XR |
| 2,003,804 | 6/1935 | Falge | 240—8.3 |
| 2,673,288 | 3/1954 | Stevens | 240—41.38 XR |
| 2,761,056 | 8/1956 | Lazo | 240—1 XR |
| 2,798,147 | 7/1957 | Orsatti | 240—8.3 XR |
| 2,922,875 | 1/1960 | Buck | 240—7.1 XR |
| 3,043,947 | 7/1962 | Albinger | 240—1 |
| 3,226,537 | 12/1965 | Hanson | 240—8.3 XR |
| 3,267,279 | 8/1966 | Doolittle | 240—8.3 XR |

JOHN M. HORAN, Primary Examiner

D. S. STALLARD, Assistant Examiner

U.S. Cl. X.R.

240—8.3, 41.38